US008745244B2

(12) United States Patent
Li et al.

(10) Patent No.: US 8,745,244 B2
(45) Date of Patent: Jun. 3, 2014

(54) METHOD AND SYSTEM FOR IMPLEMENTING POLICY AND CHARGING CONTROL IN MULTI-PDN SCENARIO

(75) Inventors: Yan Li, Beijing (CN); Weihua Qiao, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 477 days.

(21) Appl. No.: 13/051,749

(22) Filed: Mar. 18, 2011

(65) Prior Publication Data

US 2011/0173332 A1 Jul. 14, 2011

Related U.S. Application Data

(63) Continuation of application No. PCT/CN2009/073877, filed on Sep. 11, 2009.

(30) Foreign Application Priority Data

Sep. 18, 2008 (CN) .......................... 2008 1 0216273

(51) Int. Cl.
G06F 15/16 (2006.01)
G06F 15/173 (2006.01)

(52) U.S. Cl.
USPC .............................. 709/227; 709/223; 709/229

(58) Field of Classification Search
USPC .................................. 709/223, 227, 229, 246
See application file for complete search history.

(56) References Cited

U.S. PATENT DOCUMENTS

| 2007/0281699 A1 * | 12/2007 | Rasanen ........................ 455/436 |
| 2008/0229088 A1 * | 9/2008 | Barth et al. ........................ 713/1 |
| 2010/0035578 A1 * | 2/2010 | Ahmed ........................ 455/411 |
| 2011/0103266 A1 * | 5/2011 | Andreasen et al. ........... 370/259 |

FOREIGN PATENT DOCUMENTS

| CN | 1988722 A | 6/2007 |
| CN | 101047988 A | 10/2007 |
| CN | 101047989 A | 10/2007 |
| CN | 101060413 A | 10/2007 |
| CN | 101217383 A | 7/2008 |
| CN | 101217789 A | 7/2008 |
| CN | 101247335 A | 8/2008 |
| CN | 101252782 A | 8/2008 |
| CN | 101677437 B | 2/2012 |
| EP | 2056570 A1 | 5/2009 |

OTHER PUBLICATIONS

3rd Generation Partnership Project, "Technical Specification Group Services and System Aspects: Architecture Enhancements for Non-3GPP Accesses" Release 8. 3GPP TS 23.402, V8.1.1, Mar. 2008.*
GSM, "3rd Generation Partnership Project: Technical Specification Group Services and System Aspects; Policy and Charging Control Architecture" (Release 8) 3GPP TS 23.203, V8.1.1, Mar. 2008.*

(Continued)

Primary Examiner — Brian J Gillis
(74) Attorney, Agent, or Firm — Brinks, Gilson & Lione

(57) ABSTRACT

A method for implementing Policy and Charging Control (PCC) in a multi-Packet Data Network (PDN) scenario is disclosed. The method includes: a Visited Policy Control and Charging Rules Function (VPCRF) that receives PCC rules and the S9 sub-session information associated with the PCC rules from a Home Policy Control and Charging Rules Function (HPCRF), and sends the PCC rules according to the S9 sub-session information.

2 Claims, 10 Drawing Sheets

(56) References Cited

OTHER PUBLICATIONS

"3$^{rd}$ Generation Partnership Project; Technical Specification Group Core Network and Terminals; Policy and Charging Control over Gx Reference Point (Release 8)" Global System for Mobile Communications. May 2008.

"3$^{rd}$ Generation Partnership Project; Technical Specification Group Core Network and Terminals; Policy and Charging Control Signalling Flows and QoS Parameter Mapping (Release 8)". May 2008.

"3$^{rd}$ Generation Partnership Project; Technical Specification Services and System Aspects; Policy and Charging Control Architecture (Release 8)" Global System for Mobile Communications. Jun. 2008.

"3$^{rd}$ Generation Partnership Project; Technical Specification Services and System Aspects; General Packet Radio Services (GPRS) Enhancements for Evolved Universal Terrestrial Radio Access Network (E-UTRAN) Access (Release 8)" Global System for Mobile Communications. Jun. 2008.

"3$^{rd}$ Generation Partnership Project; Technical Specification Services and System Aspects; General Packet Radio Services (GPRS) Enhancements for Evolved Universal Terrestrial Radio Architecture Enhancements for Non-3GPP Accesses (Release 8)" Global System for Mobile Communications. Jun. 2008.

International Search Report issued in corresponding PCT Application No. PCT/CN2009/073877; mailed on Dec. 24, 2009.

Written Opinion of the International Searching Authority issued in corresponding PCT Patent Application No. PCT/CN2009/073877, mailed Dec. 24, 2009.

Extended European Search Report issued in corresponding European Patent Application No. 09814036.1, mailed Sep. 21, 2011.

3$^{rd}$ Generation Partnership Project, "Technical Specification Group Services and System Aspects; Architecture Enhancements for Non-3GPP Accesses" Release 8. 3GPP TS 23.402, V8.1.1, Mar. 2008.

GSM, "3$^{rd}$ Generation Partnership Project; Technical Specification Group Services and System Aspects; Policy and Charging Control Architecture" (Release 8) 3GPP TS 23.203, V8.1.1. Mar. 2008.

\* cited by examiner

METHOD AND SYSTEM FOR IMPLEMENTING POLICY AND CHARGING CONTROL IN MULTI-PDN SCENARIO

CROSS-REFERENCE TO RELATED APPLICATIONS

This application is a continuation of International Application No. PCT/CN2009/073877, filed on Sep. 11, 2009, which claims priority to Chinese Patent Application No. 200810216273.4, filed on Sep. 18, 2008, both of which are hereby incorporated by reference in their entireties.

FIELD OF THE DISCLOSURE

The present disclosure relates to communication technologies, and in particular, to a method and system for implementing Policy and Charging Control (PCC) in a scenario involving multiple Packet Data Networks (PDNs), also known as a multi-PDN scenario.

BACKGROUND

In the evolution to all Internet Protocol (IP), a communication network needs to ensure end-to-end Quality of Service (QoS) to provide services that satisfy users. An IP network provides various services (such as multimedia call, file downloading, and web browse). Different services require different QoS (including bandwidth, delay, and packet loss ratio), and employ different charging rules (such as online charging, offline charging, flow-based charging, or time-based charging).

To meet the QoS and charging requirements, the 3rd Generation Partnership Project (3GPP) defines a PCC architecture, which fulfills different QoS control and charging requirements.

As shown in FIG. 1, the 3GPP TS 23.402 defines two roaming scenarios in the PCC architecture: Home Routed and Local Breakout. Home Routed means that: A Packet Data Network Gateway (P-GW) is located in a Home PLMN (HPLMN), and the data needs to be connected to the Application Server (AS) through the home gateway. Local Breakout means that the P-GW is located in a Visited PLMN (VPLMN), and the data is connected to the AS not through the home gateway, but through the visited gateway.

In a Home Routed roaming scenario (as shown in FIG. 1*a*), a gateway control session (namely, a Gxx session) is created between a Serving Gateway (S-GW) and a Visited Policy Control and Charging Rules Function (V-PCRF or VPCRF). The V-PCRF forwards information to a Home Policy and Charging Rules Function (H-PCRF or HPCRF) through an S9 interface, and transmits the policy generated by the H-PCRF to the S-GW. An IP Connectivity Access Network (IP-CAN) session (namely, a Gx session) is created between the P-GW and the H-PCRF. The gateway control session information and the IP-CAN session information are transmitted to the H-PCRF respectively, and the H-PCRF generates policies. In this scenario, the IP-CAN session information of the P-GW does not pass through the V-PCRF.

In a Local Breakout roaming scenario (as shown in FIG. 1*b*), a gateway control session is created between the S-GW and the V-PCRF, and an IP-CAN session is created between the P-GW and the V-PCRF. The V-PCRF processes the gateway control session information and the IP-CAN session information, and then forwards the information to the H-PCRF. The H-PCRF generates policies. The H-PCRF delivers generated PCC rules to the V-PCRF. The V-PCRF extracts information from the PCC rules to generate QoS rules, sends the PCC rules to the P-GW and sends the QoS rules to the S-GW. In this scenario, the V-PCRF decides whether to transmit the gateway control session information to the H-PCRF according to information such as the PDN identifier (ID) and roaming agreement. The IP-CAN session information of the P-GW is sent to the V-PCRF. The V-PCRF processes the information and generates an S9 session, and transmits the information to the H-PCRF.

For ease of understanding, the terms involved in the PCC architecture are described below:

IP-CAN: If the IP service connectivity is maintained (namely, without interrupting the service) when a user roams in an access network (changes the location), such an access network is called "IP-CAN". Examples of an IP-CAN include a General Packet Radio Service (GPRS) network and an Interworking Wireless Local Area Network (I-WLAN).

IP-CAN session: An IP-CAN session refers to a connection relation between a user and a PDN ID (for example, the ID indicates that the network is the Internet), and this connection relation is identified by the IP address of the user and the user ID (for example, an International Mobile Station Identity (IMSI) in the 3GPP). The IP-CAN exists only if the user is allocated an IP address and can be identified by the IP network. The IP-CAN session may include one or more IP-CAN bearers.

S9 session: The S9 session is a session between the V-PCRF and the H-PCRF, designed to transmit IP-CAN session information, gateway control session information or Rx information to the H-PCRF, and also designed for the H-PCRF to transmit PCC (including QoS) rule information.

Besides, the functional entities in the PCC architecture are described below:

S-GW: The S-GW is responsible for processing the mobility of the user, and interacts with the P-GW through an S5/S8 interface over the GPRS Tunneling Protocol (GTP) or Proxy Mobile Internet Protocol (PMIP), and interacts with the PCRF through a gateway control session interface (namely, a Gxx interface) by means of Diameter messages.

P-GW: The P-GW is responsible for communications with the external PDN (Internet, or IP service defined by an operator such as IP Multimedia Subsystem (IMS)) through an SGi interface (not illustrated in the figure), and interacts with the S-GW through an S5/S8 interface over GTP or PMIP, and interacts with the PCRF through an IP-CAN interface (Gx interface) by means of Diameter messages.

H-PCRF: The H-PCRF is responsible for policy decision and flow-based charging control. The H-PCRF decides the corresponding policy according to the policy of the operator, user subscription data (obtained from a Subscription Profile Repository (SPR)) and the ongoing service information (obtained from an Application Function (AF)), and provides the policy to a Policy and Charging Enforcement Function (PCEF), and the PCEF enforces the policy. The policy may be PCC rules or independent properties. For ease of description, the description herein ignores the nuances between the policy and the PCC rule. The H-PCRF provides the QoS policy to a Bearer Binding and Event Reporting Function (BBERF). The BBERF performs the QoS and the session control function. The policies include rules for detecting service data flows (namely, a set of IP flows for implementing a service such as voice communications), gating or not, QoS, and flow-based charging rule.

V-PCRF: The V-PCRF exists in a Local Breakout scenario, and sends the service information provided by the visited AF and the IP-CAN session information of the P-GW to the H-PCRF, and provides an event reporting function. The V-PCRF provides operator policies in the visited network so that the H-PCRF can formulate PCC rules. The V-PCRF transmits the PCC policies formulated by the H-PCRF to the P-GW, transmits the QoS policy formulated by the H-PCRF to the S-GW, and answers the gateway control session. In a Home Routed scenario, the V-PCRF reports events to the H-PCRF, and provides the operator policies in the visited network so that the H-PCRF can formulate PCC rules; the V-PCRF transmits the QoS policy formulated by the H-PCRF to the S-GW, and answers the gateway control session.

PCEF (included in the P-GW): The PCEF detects service data flows, enforces policies, and performs flow-based charging. The PCEF enforces the policies delivered or specified by the PCRF. Specifically, the PCEF detects and measures the service data flows, ensures the QoS of the service data flows, processes the user-plane traffic, and triggers the control-plane session management. The PCEF may exist in a network entity such as a PDN GW in a System Architecture Evolution (SAE) network.

BBERF (included in an S-GW): The BBERF is capable of bearer binding, uplink bearer verification, and event reporting. The BBERF may exist in a network entity such as an S-GW in the SAE network, or a non-3GPP access gateway in a non-3GPP network.

FIG. 2 shows a multi-PDN scenario. In this scenario:

1. A User Equipment (UE) is connected to different external PDNs (PDN1 or PDN2 in FIG. 2);

2. The UE is connected to the PDN through an S-GW or a non-3GPP access gateway, and one or more P-GWs;

3. The PDN-GW creates an IP-CAN session (Gx1 and Gx2 in FIG. 2) for every external PDN connection of the UE;

4. If the S-GW or the non-3GPP access gateway communicates with the PDN-GW through PMIP, the S-GW creates a gateway control session (Gxx1 and Gxx2 in FIG. 2) for every external PDN connection of the UE; and 5. If the non-3GPP access gateway communicates with the PDN-GW through the Client Mobile Internet Protocol (CMIP), the S-GW creates a gateway control session (not illustrated in FIG. 2) for the UE.

In this scenario, the S9 session is created for every UE. The S9 interface has only one session. The gateway control session and all information of the IP-CAN session are sent as S9 session information. The first IP-CAN session or gateway control session triggers creation of the S9 session, and creation, modification or deletion of every subsequent IP-CAN session or gateway control session triggers modification or deletion of the S9 session.

As regards the multi-PDN scenario, the inventor finds at least the following problems in the prior art in the process of implementing the present disclosure:

The S9 session is unable to distinguish or handle creation, modification or deletion of the IP-CAN session and the gateway control session, and thus the V-PCRF is unable to understand the information delivered by the H-PCRF and unable to send the information to the correct PCEF or BBERF for enforcement, which leads to failure of the PCC function; if the V-PCRF is unable to report the PDN connection release information to the H-PCRF, the H-PCRF is unable to release the corresponding PDN connection, which leads to ineffective occupation of resources and incorrect policies.

SUMMARY

Embodiments of the present disclosure provide a method and system for implementing PCC in a multi-PDN scenario to overcome the following defects in the prior art: the S9 session in a multi-PDN scenario is unable to distinguish or handle creation, modification or deletion of an IP-CAN session and an gateway control session, and the V-PCRF is unable to understand the information delivered by the H-PCRF and unable to send the information to the correct PCEF or BBERF for enforcement, which leads to failure of the PCC function.

A method for implementing PCC in a multi-PDN scenario in an embodiment of the present disclosure includes: receiving, by a VPCRF, P CC rules and associated S9 sub-session information sent by an HPCRF; and sending the associated PCC rules according to the S9 sub-session information.

Another method for implementing PCC in a multi-PDN scenario in an embodiment of the present disclosure includes: receiving, by an HPCRF, a trigger event sent by a VPCRF; modifying corresponding PCC rules according to the trigger event; and sending the PCC rules and associated S9 sub-session information to the VPCRF so that the VPCRF sends the PCC rules according to the received associated S9 sub-session information.

A system for implementing PCC in a multi-PDN scenario in an embodiment of the present disclosure includes an HPCRF and a VPCRF. The HPCRF is configured to: receive a trigger event sent by a VPCRF, modify corresponding PCC rules according to the trigger event, and send the PCC rules and associated S9 sub-session information to the VPCRF. The VPCRF is configured to receive the PCC rules and the associated S9 sub-session information associated with the PCC rules from the HPCRF, and send the PCC rules according to the associated S9 sub-session information.

In the embodiments of the present disclosure, an S9 session message carries S9 sub-session information associated with PCC rules, and therefore, in a multi-PDN scenario, the S9 session can distinguish and handle creation, modification and deletion of the IP-CAN session and the gateway control session, and the V-PCRF can understand the information delivered by the H-PCRF, and send the information to the correct PCEF or BBERF for enforcement; moreover, the V-PCRF can report the PDN connection release information to the H-PCRF, and the H-PCRF releases the corresponding PDN connection, thus avoiding ineffective occupation of resources and ensuring correct policies.

DETAILED DESCRIPTION OF THE EMBODIMENTS

To make the solution, objectives and merits of the present disclosure clearer, the following describes the embodiments of the present disclosure in more detail with reference to accompanying drawings.

Figure 1A:
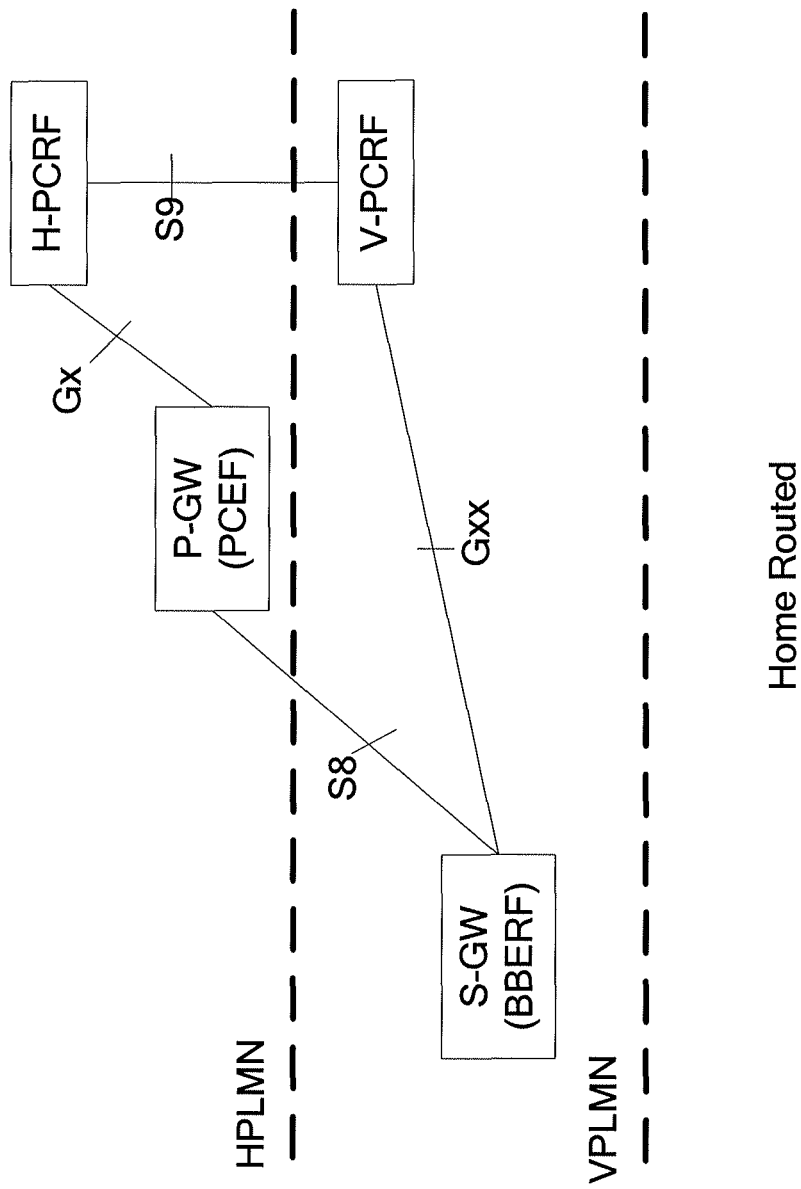
FIG. 1a shows a Home Routed roaming scenario in a PCC architecture defined by the 3GPP in the prior art.
Figure 1B:
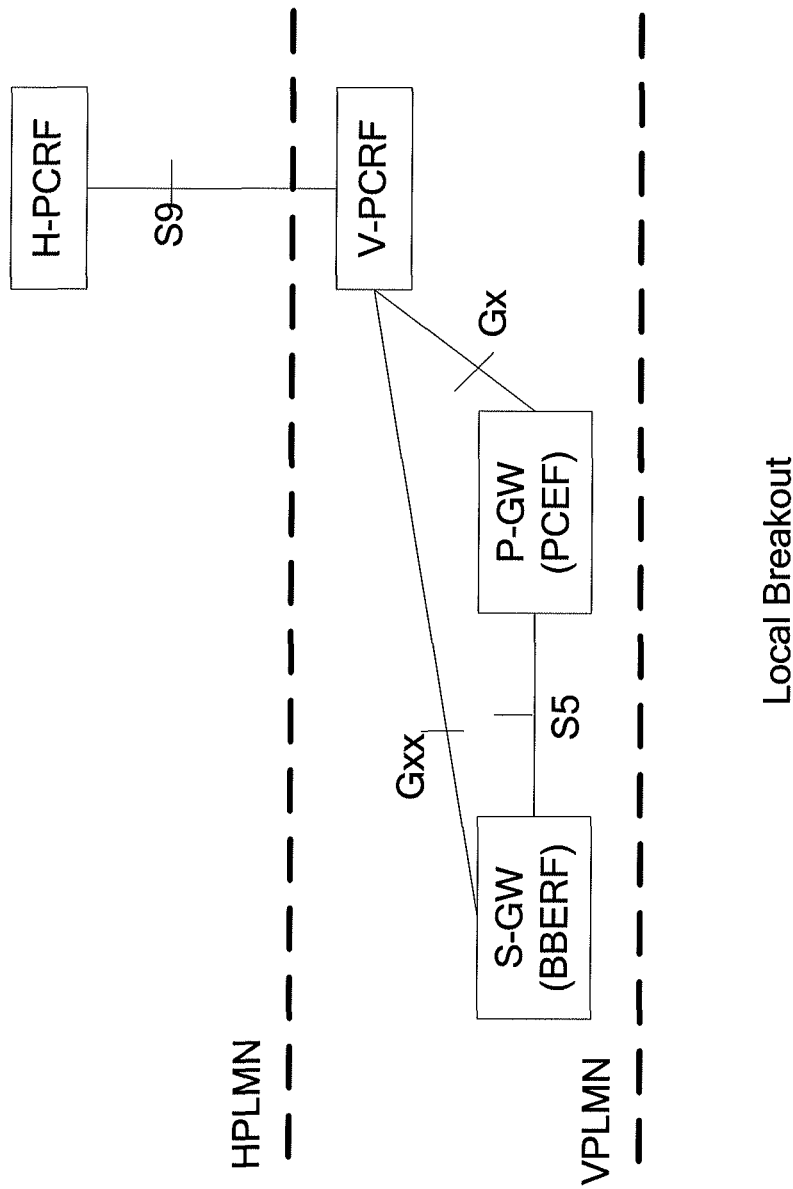
FIG. 1b shows a Local Breakout roaming scenario in a PCC architecture defined by the 3GPP in the prior art.
Figure 2:
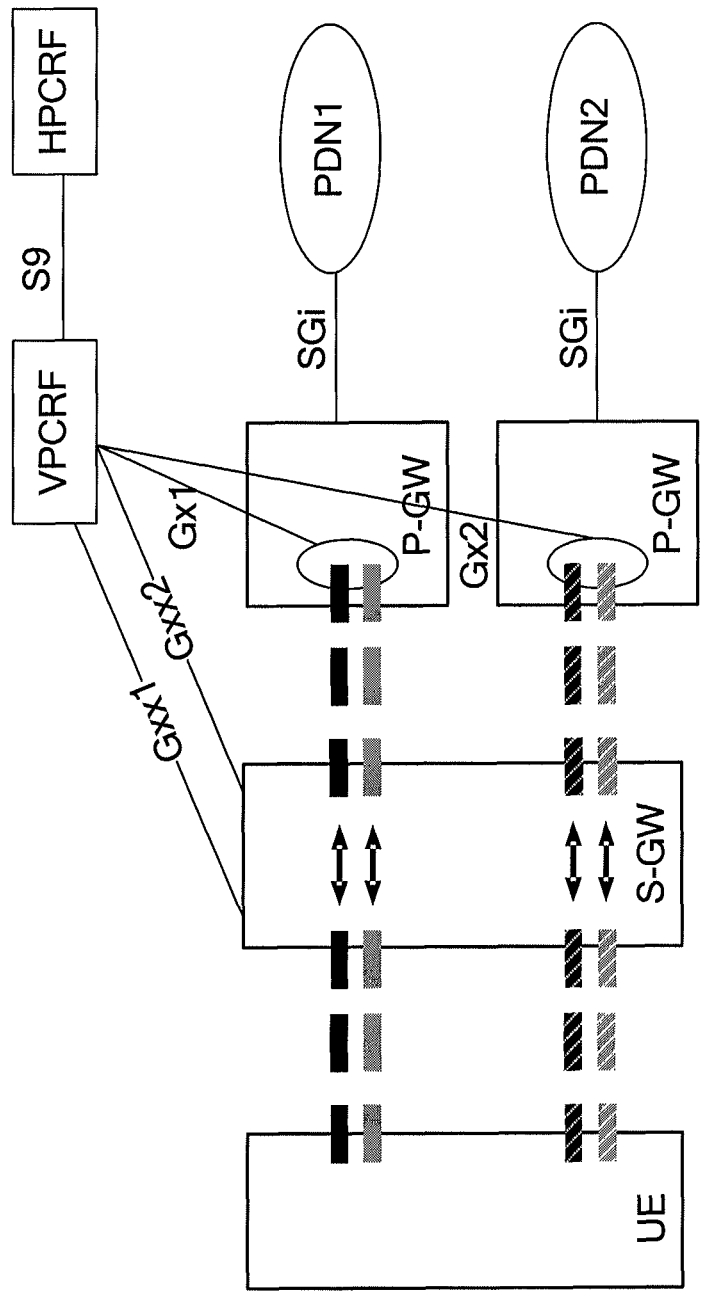
FIG. 2 shows a multi-PDN scenario in the prior art.
Figure 3:
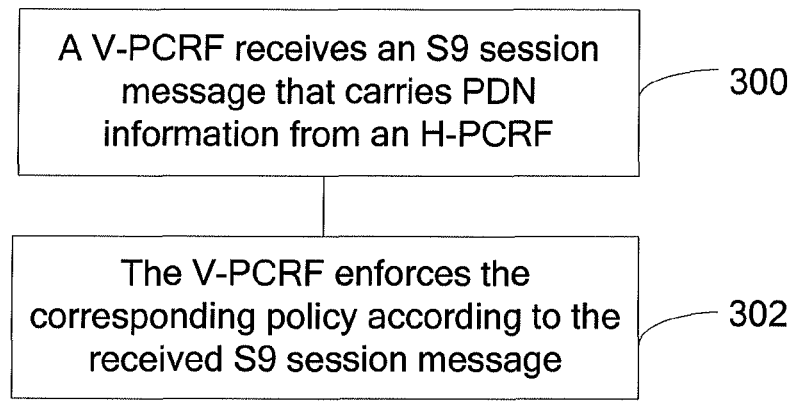
FIG. 3 is a flowchart of a method for implementing an S9 session in a multi-PDN scenario according to an embodiment of the present disclosure.

As shown in FIG. 3, the method for implementing an S9 session in a multi-PDN scenario in an embodiment of the present disclosure includes the following steps:

Step 300: A V-PCRF receives an S9 session message that carries PDN information from an H-PCRF.

The S9 session message carries the PDN information. In practice, the PCC rules defined in the existing IP-CAN session may be extended to carry the PDN information. Here is an example:

```
Charging-Rule-Definition ::= < AVP Header: 1003 >
                            { Charging-Rule-Name }
                            [ Called-Station-ID ]
                            [ Service-Identifier ]
                            [ Rating-Group ]
                           *[ Flow-Description ]
                            [ Flow-Status ]
                            [ QoS-Information ]
                            [ Reporting-Level ]
                            [ Online ]
                            [ Offline ]
                            [ Metering-Method ]
                            [ Precedence ]
                            [ AF-Charging-Identifier ]
                           *[ Flows ]
                           *[ AVP ]
```

"Charging-Rule-Definition AVP" above is the definition of the existing PCC rules, and the newly added "Called-Station-ID" represents the PDN corresponding to the PCC rules.

Alternatively, the "Charging-Rule-Install" may be extended to indicate that all PCC rules under this Attribute Value Pair (AVP) are associated with the PDN. Here is an example:

```
Charging-Rule-Install ::=   < AVP Header: 1001 >
                           *[ Charging-Rule-Definition ]
                           *[ Charging-Rule-Name ]
                           *[ Charging-Rule-Base-Name ]
                            [ Called-Station-ID ]
                            [ Bearer-Identifier ]
                           *[ AVP ]
```

"Charging-Rule-Definition" above indicates multiple dynamic PCC rules to be installed; "Charging-Rule-Name" and "Charging-Rule-Base-Name" indicate multiple pre-defined PCC rules to be activated; and "Called-Station-ID" indicates the PDN corresponding to such rules.

It should be noted that in addition to the PCC rules, other AVP parameters specific to the PDN may be set in a similar way. For example, the APN-AMBR parameter (indicating the maximum bandwidth shared by all non-GBR bearers connected to the same PDN) may be set in the following mode:

```
APN-AMBR ::=    < AVP Header:xxxx >
                [ Max-Requested-Bandwidth-UL ]
                [ Max-Requested-Bandwidth-DL ]
                [ Called-Station-ID ]
               *[ AVP ]
```

"Max-Requested-Bandwidth-UL" and "Max-Requested-Bandwidth-DL" above indicate the shared maximum bandwidth information, and the "Called-Station-ID" indicates the associated PDN information.

Step 302: The V-PCRF enforces the corresponding policy according to the received S9 session message.

The V-PCRF searches for the corresponding IP-CAN session and/or gateway control session according to the PDN information and IP address information carried in the PCC rules, and sends the PCC rules to the corresponding IP-CAN session (P-GW). If a gateway control session is associated, the V-PCRF extracts QoS rules from the PCC rules and sends QoS rules to the corresponding gateway control session (BBERF).

Likewise, after receiving PDN-specific information, the V-PCRF sends the information to the corresponding IP-CAN session or gateway control session.

The following embodiments expound the mode of implementing the foregoing method in different scenarios.

Embodiment 1

Figure 4:
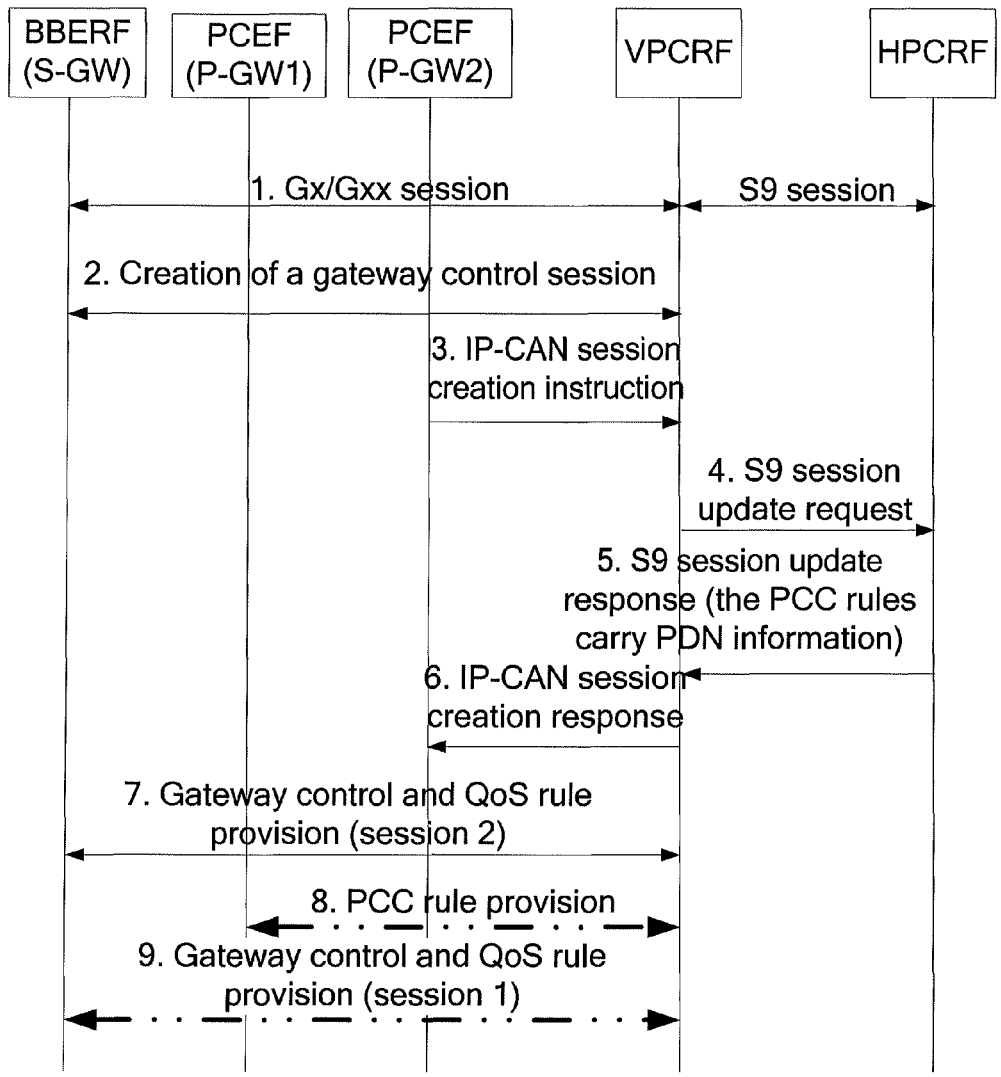
FIG. 4 is a flowchart of a first embodiment of the present disclosure.

FIG. 4 shows a roaming scenario of 3GPP access, where a P-GW is located in a visited network, an S8 session is based on a PMIP protocol, a BBERF is located in an S-GW, a PCEF is located in the P-GW, and an S9 session is already created between the VPCRF and the HPCRF. The user initiates creation of a connection to PDN2. The HPCRF delivers the PCC rules to the VPCRF through the S9 session, and the session message carries PDN information. The VPCRF sends the received PCC rules to the PCEF (P-GW), and extracts the QoS rules from the PCC rules and sends the QoS rules to the BBERF (S-GW). The detailed steps are as follows:

1. The user has created a gateway control session, an IP-CAN session and an S9 session which correspond to PDN1.

2. The user initiates creation of a connection to PDN2. First, the user triggers the BBERF (SGW) to initiate creation of a gateway control session. After receiving the message for creating the gateway control session, the VPCRF determines that the PDN connection is a Local Breakout scenario, and therefore, conceals the gateway control session (without sending a session update message to the HPCRF), and returns a response for creating the gateway control session to the BBERF directly.

3. The PCEF sends an IP-CAN session instruction message to the VPCRF as an instruction of creating an IP-CAN session, and requests the PCC rules from the VPCRF.

4. The VPCRF sends an S9 session update message that carries IP-CAN session information, PDN2 information, and the user IPv4 address corresponding to PDN2.

5. According to the IP-CAN session information, gateway control session information, user subscription information, and policies defined by the operator, the HPCRF formulates PCC rules and sends the rules to the VPCRF through an S9 session update response. The rules include the PDN information associated with the PCC rules.

In practice, the Charging-Rule-Definition may be extended to carry PDN2 information:

```
Charging-Rule-Definition ::= < AVP Header: 1003 >
                            { Charging-Rule-Name }
                            [ Called-Station-ID ]
                            [ Service-Identifier ]
                            [ Rating-Group ]
                           *[ Flow-Description ]
```

```
            [ Flow-Status ]
            [ QoS-Information ]
            [ Reporting-Level ]
            [ Online ]
            [ Offline ]
            [ Metering-Method ]
            [ Precedence ]
            [ AF-Charging-Identifier ]
           *[ Flows ]
           *[ AVP ]
```

Alternatively, "Charging-Rule-Install" is extended to indicate that all installed rules are specific to PDN2:

```
Charging-Rule-Install ::=   < AVP Header: 1001 >
                           *[ Charging-Rule-Definition ]
                           *[ Charging-Rule-Name ]
                           *[ Charging-Rule-Base-Name ]
                            [ Called-Station-ID ]
                                [ Bearer-Identifier ]
                           *[ AVP ]
```

Optionally, this message may carry rules specific to PDN1.

6. The VPCRF sends an IP-CAN session response message to the P-GW connected to PDN2 according to the PDN information in the PCC rules.

7. The VPCRF extracts QoS rules from the PCC rules, and sends the QoS rules to the S-GW through the newly created gateway control session.

8. If the S9 message sent by the HPCRF carries the PCC rules specific to PDN1, the VPCRF sends the PCC rules to P-GW1 connected to PDN1.

9. If the S9 message sent by the HPCRF carries the PCC rules specific to PDN1, the VPCRF sends the extracted QoS rules to the S-GW through the previously created gateway control session.

Step 8 and step 9 above are optional.

Embodiment 2

Figure 5:
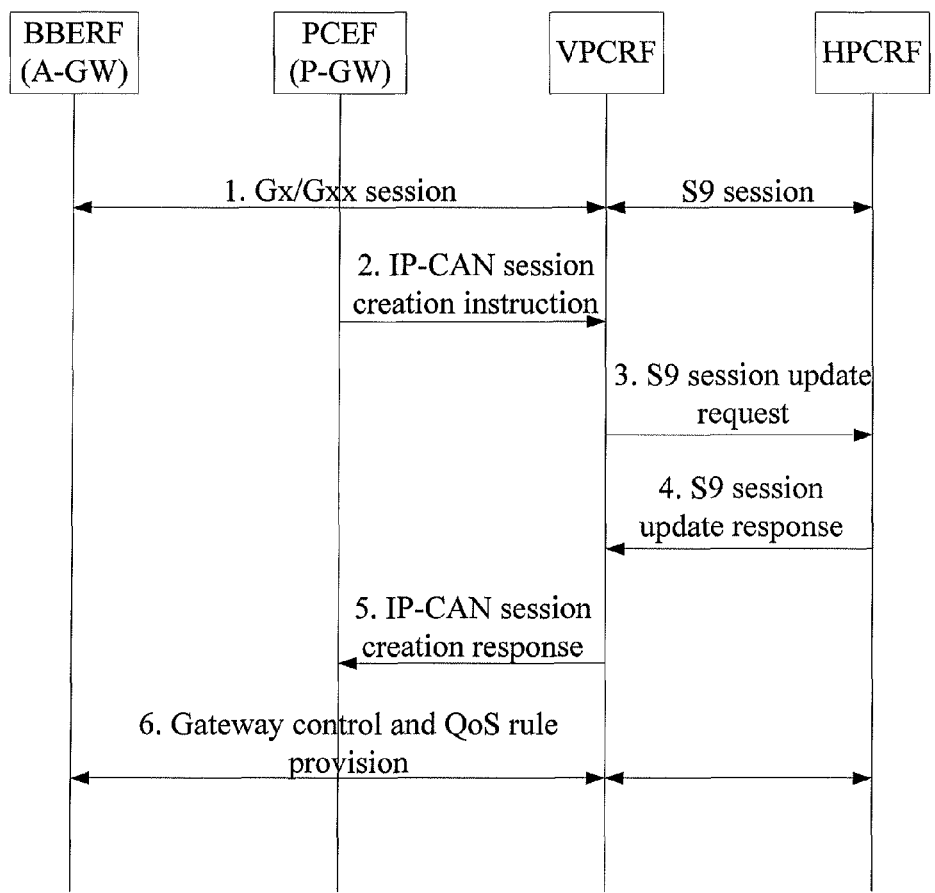
FIG. 5 is a flowchart of a second embodiment of the present disclosure.

FIG. 5 shows a CMIP roaming scenario of trusted non-3GPP access. The UE communicates with the P-GW through a Dual Stack Mobile IP (DSMIP) protocol, a BBERF is located in an A-GW (the A-GW is located in the visited network), a PCEF is located in the P-GW (the P-GW is located in the home network), and an S9 session is already created between the VPCRF and the HPCRF. The user initiates creation of a connection to PDN2. The HPCRF delivers the PCC rules to the VPCRF through the S9 session, and the session message carries PDN information. The VPCRF sends the received PCC rules to the PCEF (P-GW). Through the S9 session, the HPCRF delivers the QoS rules to the BBERF. The session carries tunnel information (based on the prior art). The BBERF distinguishes the PDN corresponding to the QoS rules according to the tunnel information. The detailed steps are as follows:

1. The user has created a gateway control session, an IP-CAN session and an S9 session which corresponds to PDN1.

2. The user initiates creation of a connection to PDN2. In a CMIP scenario, one gateway control session of the same user is associated with multiple IP-CAN sessions. Therefore, it not necessary to create a second gateway control session. The PCEF sends an IP-CAN session instruction message to the VPCRF as an instruction of creating an IP-CAN session, and requests the PCC rules from the VPCRF.

3. The VPCRF sends an S9 session update message that carries IP-CAN session information, PDN2 information, and the user IPv4/IPv6 address corresponding to PDN2.

4. According to the IP-CAN session information, gateway control session information, user subscription information, and policies defined by the operator, the HPCRF formulates PCC rules and sends the rules to the VPCRF through an S9 session update response. The PCC rules carry PDN2 information. The detailed implementation mode is the same as that of the first embodiment.

5. The VPCRF sends an IP-CAN session response message that carries PCC rules to the P-GW.

6. The HPCRF delivers the QoS rules to the VPCRF through an S9 interface. The VPCRF forwards the QoS rules to the BBERF. The QoS rules carry a tunnel ID so that the BBERF can distinguish the QoS rules of different PDNs.

Embodiment 3

Figure 6:
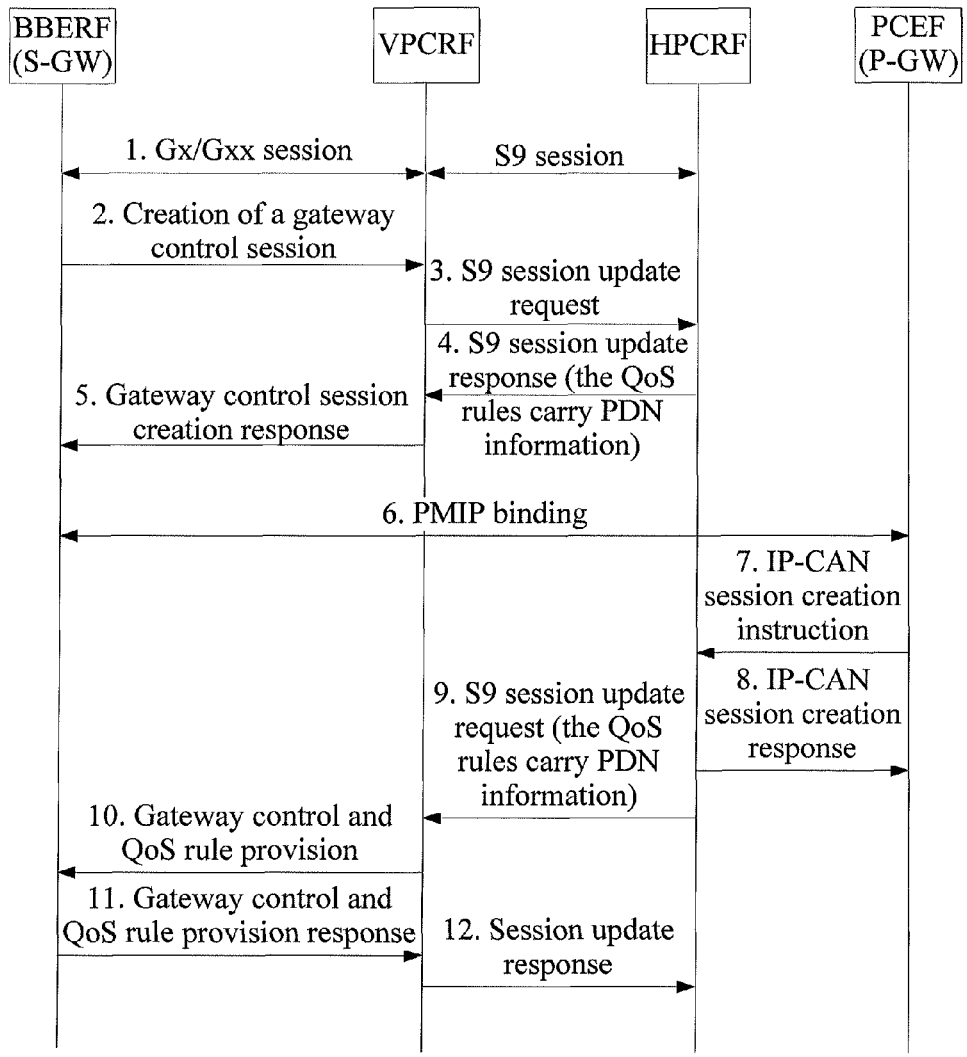
FIG. 6 is a flowchart of a third embodiment of the present disclosure.

FIG. 6 shows a roaming scenario of 3GPP access, where a P-GW connected to PDN2 is located in a visited network, an S8 session is based on a PMIP protocol, a BBERF is located in an S-GW, a PCEF is located in the P-GW, and an S9 session is already created between the VPCRF and the HPCRF. The user initiates creation of a connection to PDN2. The HPCRF delivers the QoS rules to the VPCRF through the S9 session, and the session message carries PDN information. The VPCRF sends the received QoS rules to the BBERF (S-GW). The detailed steps are as follows:

1. The user has created a gateway control session, an IP-CAN session and an S9 session which correspond to PDN1.

2. The user initiates creation of a connection to PDN2, and triggers the BBERF (SGW) to initiate creation of a gateway control session first.

3. After receiving the message for creating the gateway control session, the VPCRF determines that the PDN is connected to the home P-GW, and sends an S9 session update message (Credit Control Request (CCR)) that carries PDN2 information to the HPCRF.

4. According to the gateway control session information, user subscription information, and policies defined by the operator, the HPCRF formulates QoS rules and sends the rules to the VPCRF through an S9 session update response (Credit Control Answer (CCA)). The rules include the PDN information associated with the QoS rules.

In practice, the QoS-Rule-Definition may be extended to carry PDN2 information:

```
QoS-Rule-Definition ::= < AVP Header: xxxx >
                       {QoS -Rule-Name }
                        [ Called-Station-ID ]
                       *[ Flow-Description ]
                        [ QoS-Information ]
                        [ Precedence ]
                        * [ AVP ]
```

Alternatively, "QoS-Rule-Install" is extended to indicate that all installed QoS rules are specific to PDN2:

```
QoS-Rule-Install ::=    < AVP Header: xxxx >
                       *[ QoS-Rule-Definition ]
                        [ Called-Station-ID ]
                       *[ AVP ]
```

5. After receiving the message, the VPCRF returns the QoS rules to the corresponding gateway control session according to the PDN information carried in the message.

6. The BBERF initiates a PMIP binding process to the home PCEF.

Step 6 and step 2 may occur simultaneously.

7. The PCEF sends an IP-CAN session instruction message (CCR) to the HPCRF as an instruction of creating an IP-CAN session, and requests the PCC rules from the HPCRF.

8. According to the IP-CAN session information, gateway control session information, user subscription information, and policies defined by the operator, the HPCRF formulates PCC rules and sends the rules to the PCEF through an IP-CAN session creation response (CCA).

9. If the HPCRF needs to install new QoS rules or modify existing QoS rules according to the IP-CAN session information, ongoing service information, user subscription information, and policies defined by the operator, the HPCRF sends an S9 session update message (Re-Auth Request (RAR)) that carries the new QoS rules or modified QoS rules to the VPCRF. The rules carry PDN information. The details are given in step 4.

10. If the S9 message sent by the HPCRF carries the QoS rules specific to PDN2, the VPCRF sends the QoS rules to the BBERF through the newly created gateway control session.

Embodiment 4

Figure 7:
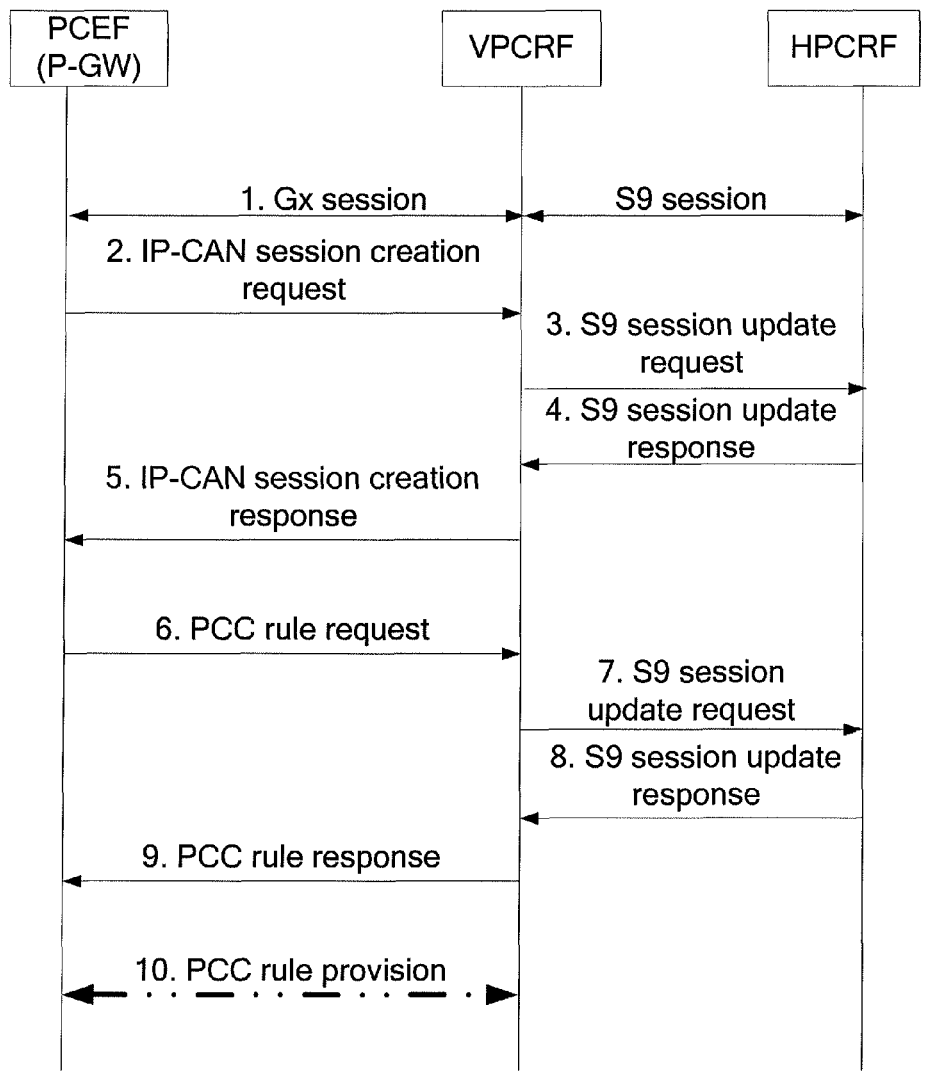
FIG. 7 is a flowchart of a fourth embodiment of the present disclosure.

FIG. 7 shows a roaming scenario of 3GPP access, where the P-GW connected to PDN2 is located in the home network. The S8 session is based on a GTP protocol, the PCEF is located in the P-GW, and the S9 session between the VPCRF and the HPCRF is already created. The user initiates creation of a connection to PDN2. The HPCRF delivers the PCC rules to the VPCRF through the S9 session, and the session message carries PDN information. The VPCRF sends the received PCC rules to the PCEF (P-GW).

1. The user has created an IP-CAN session and an S9 session which correspond to PDN1.

2. The user initiates creation of a connection to PDN2, and triggers the PCEF (P-GW) to initiate creation of an IP-CAN session first.

The first IP-CAN session and the second IP-CAN session in this embodiment are created by the same P-GW or by different P-GWs.

3. The VPCRF sends an S9 session update message that carries IP-CAN session information, PDN2 information, and the user IPv4/IPv6 address corresponding to PDN2.

4. According to the IP-CAN session information, user subscription information, and policies defined by the operator, the HPCRF formulates PCC rules and sends the rules to the VPCRF through an S9 session update response. The PCC rules carry PDN2 information. The detailed implementation mode is the same as that of the first embodiment.

5. The VPCRF sends an IP-CAN session creation response message that carries PCC rules to the PCEF.

6. The PCEF detects occurrence of certain events (such as the change of an access technology, or change of a user location), and requests new PCC rules from the VPCRF. The request (CCR) carries a trigger event and is sent on the IP-CAN session corresponding to PDN2.

7. The VPCRF initiates session update. The message carries the trigger event.

8. According to the trigger event, the HPCRF modifies the existing PCC rules, and sends the modified PCC rules to the VPCRF through an S9 session update response. The PCC rules include PDN information. The detailed implementation mode is the same as that of the first embodiment. Meanwhile, the HPCRF modifies the maximum bandwidth (APN-AMBR) parameter shared by all non-GBR bearers under each PDN.

In practice, the CCA message may carry multiple APN-AMBR parameters:

```
<CC-Answer> ::=    < Diameter Header: 272, PXY >
                   < Session-Id >
                   { Auth-Application-Id }
                   { Origin-Host }
                   { Origin-Realm }
                   *[ APN-AMBR ]    * indicates multiple parameters
                   Other AVPs are omitted
```

Each APN-AMBR is defined as:

```
APN-AMBR ::=    < AVP Header:xxxx >
                [ Max-Requested-Bandwidth-UL ]
                [ Max-Requested-Bandwidth-DL ]
                [ Called-Station-ID ]
                *[ AVP ]
```

The Called-Station-ID above indicates the associated PDN information. In this way, one message may carry multiple APN-AMBR parameters, and each parameter is associated with a PDN (such as PDN 1, 2 or 3).

Because a lot of information needs to be associated with the PDN, this embodiment takes the APN-AMBR parameter as an example, and other parameters can be handled in the same way.

9. The VPCRF returns a PCC rule response message to the PCEF. If the response message returned by the HPCRF includes PCC rules specific to PDN2, the modified PCC rules are carried in this response message (CCA) directly.

10. If the response message returned by the HPCRF includes PCC rules specific to PDN1, the VPCRF delivers the modified PCC rules to the PCEF through an IP-CAN session specific to PDN1 (RAR message).

Embodiment 5

In a multi-PDN scenario, when the VPCRF notifies the HPCRF to release an IP-CAN session and/or a gateway control session corresponding to a PDN, or when the HPCRF notifies the VPCRF to release an IP-CAN session and/or a gateway control session corresponding to a PDN, an operation of updating the S9 session needs to be initiated, and the S9 session message needs to carry PDN information and the IPv4 and/or IPv6 address corresponding to the PDN.

(1) For S9 session update initiated by the VPCRF, the VPCRF may use a CCR command which instructs the HPCRF to release the IP-CAN and/or gateway control session corresponding to a PDN. In practice, the existing CCR may be extended. For example, an extended CCR message is:

```
<CC-Request> ::= < Diameter Header: 272, REQ, PXY >
                 < Session-Id >
                 { Auth-Application-Id }
                 { Origin-Host }
                 { Origin-Realm }
                 { Destination-Realm }
                 { CC-Request-Type }
```

```
            { CC-Request-Number }
            [ Destination-Host ]
            [ Origin-State-Id ]
            [ Framed-IP-Address ]
            [ Framed-IPv6-Prefix ]
            [ Called-Station-ID ]
            [PDN-CONNECT-RELEASE]
               Other AVPs are omitted
```

In the message above, "Called-Station-ID" represents a PDN, "Framed-IP-Address" and "Framed-IPv6-Prefix" represent the IPv4 and IPv6 addresses corresponding to the PDN; and "PDN-CONNECT-RELEASE" is a newly added information element which is an instruction of releasing a PDN connection.

"Called-Station-ID", "Framed-IP-Address", and "Framed-IPv6-Prefix" are existing information elements.

(2) For S9 session update initiated by the HPCRF, the HPCRF may use an RAR command which instructs the VPCRF to release the IP-CAN and/or gateway control session corresponding to a PDN. In practice, the existing RAR may be extended. For example, an extended RAR message is:

```
<RA-Request> ::= < Diameter Header: 258, REQ, PXY >
              < Session-Id >
              { Auth-Application-Id }
              { Origin-Host }
              { Origin-Realm }
              { Destination-Realm }
              { Destination-Host }
              { Re-Auth-Request-Type }
              [ Origin-State-Id ]
                    [PDN-CONNECT-RELEASE]
           [ Called-Station-ID ]
                    [ Framed-IP-Address ]
                    [ Framed-IPv6-Prefix ]
              Other AVPs are omitted
```

In the message above, "Called-Station-ID" represents a PDN, "Framed-IP-Address" and "Framed-IPv6-Prefix" represent the IPv4 and IPv6 addresses corresponding to the PDN; and "PDN-CONNECT-RELEASE" is an instruction of releasing a PDN connection.

Such information elements are newly added.

If the VPCRF receives an S9 session update message from the HPCRF, or the HPCRF receives an S9 session update message from the VPCRF, at the time of releasing the IP-CAN session and/or gateway control session corresponding to a PDN, the VPCRF/HPCRF finds the corresponding IP-CAN session and/or gateway control session according to the PDN information and IP address in the message, and initiates an operation of releasing the IP-CAN session and/or gateway control session.

Figure 8:
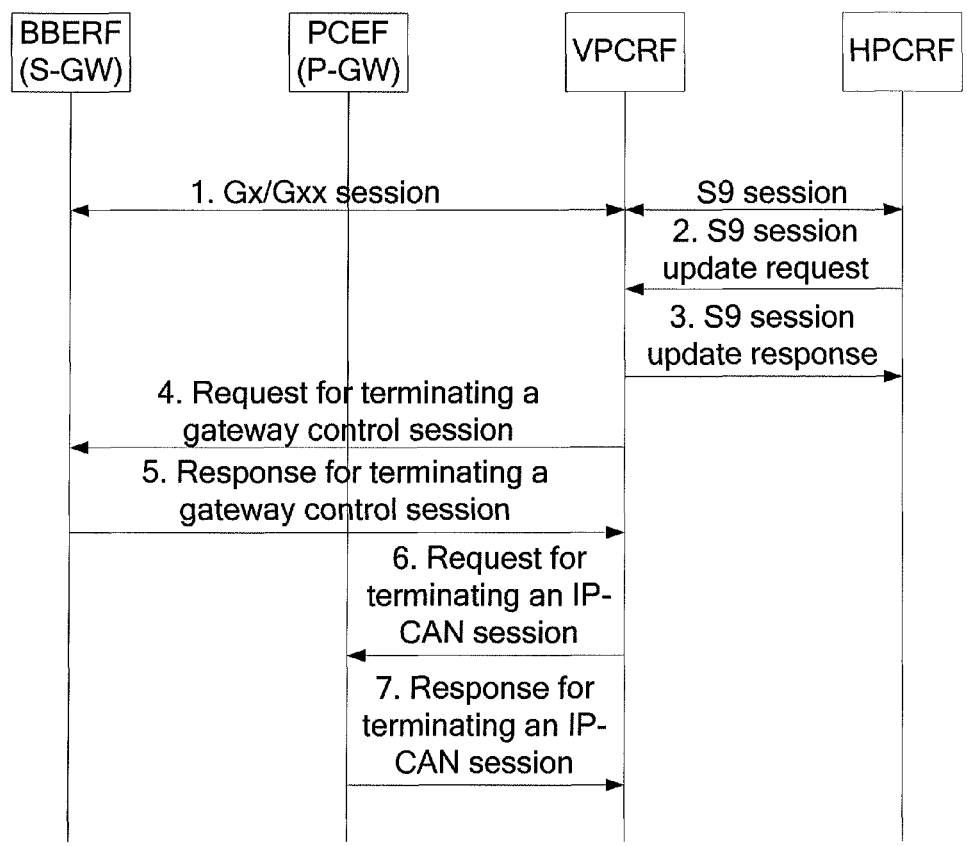
FIG. 8 is a flowchart of a fifth embodiment of the present disclosure.

FIG. 8 shows a roaming scenario of 3GPP access, where an S8 session is based on a PMIP protocol, a BBERF is located in an S-GW, a PCEF is located in the P-GW, and an S9 session is already created between the VPCRF and the HPCRF. The user has three IP-CAN sessions and three gateway control sessions, which correspond to PDN1, PDN2, and PDN3 respectively. As triggered by internal or external conditions, the HPCRF needs to initiate release of the gateway control session and IP-CAN session corresponding to PDN3, and therefore, the S9 session update message carries PDN information and the corresponding IP address information and release instruction. The detailed steps are as follows:

1. The user has created three IP-CAN sessions and three gateway control sessions, which correspond to PDN1, PDN2, and PDN3 respectively.

2. As triggered by internal or external conditions, the HPCRF needs to initiate release of the gateway control session and IP-CAN session corresponding to PDN3, and therefore, the S9 session update message (such as RAR) carries PDN3 and a release instruction, and optionally, carries IP address information.

3. The VPCRF answers the S9 session update message of the HPCRF.

4. The VPCRF initiates release of the gateway control session corresponding to PDN3.

5. The BBERF (S-GW) makes an answer to the request for releasing the gateway control session.

The gateway control session is applicable only to the S8 interface based on PMIP. If the S8 interface is based on GTP, no gateway control session exists.

6. The VPCRF initiates release of the IP-CAN session corresponding to PDN3.

7. The PCEF (P-GW) makes an answer to release of the IP-CAN session.

Note:

(1) The IP-CAN session exists only if the PCEF is located in the visited network; and (2) It is possible that the VPCRF does not answer the HPCRF in step 3 until step 7 is completed.

Embodiment 6

In the existing Diameter protocol, a concept of sub-session (CC-Sub-Session-Id) exists. In an S9 session, if each IP-CAN session or gateway control session is managed as a sub-session, the creation of each IP-CAN session and/or gateway control session corresponds to creation of the S9 sub-session; and the deletion of each sub-session corresponds to deletion of the IP-CAN session and/or gateway control session. The message of each sub-session may carry PCC or QoS rules. The rules are specific to this sub-session (namely, the corresponding IP-CAN session and/or gateway control session). According to the analysis above, the use of sub-sessions solves the problems involved in the S9 interface which uses one session.

However, the existing Diameter protocol does not specify how to modify multiple sub-sessions through one message. That is, each message is specific to the whole session, or specific to a single sub-session. No mechanism is available for modifying a part of the sub-sessions. In the PCC, information or rules for modifying a part of sub-sessions (the corresponding IP-CAN session and/or gateway control session) exist.

Therefore, a possible implementation mode is: The PCC rules specify the sub-session IDs corresponding to the PCC rules. In this way, one message (the session ID is a main session) includes multiple PCC rules corresponding to different sub-sessions. The rules are extended in the following way:

```
Charging-Rule-Definition ::= < AVP Header: 1003 >
              { Charging-Rule-Name }
              [CC -Sub-Session-Id]
              [ Service-Identifier ]
              [ Rating-Group ]
            *[ Flow-Description ]
              [ Flow-Status ]
              [ QoS-Information ]
              [ Reporting-Level ]
```

```
            [ Online ]
            [ Offline ]
            [ Metering-Method ]
            [ Precedence ]
            [ AF-Charging-Identifier ]
            *[ Flows ]
            *[ AVP ]
    or
        Charging-Rule-Install ::= < AVP Header: 1001 >
            *[ Charging-Rule-Definition ]
            *[ Charging-Rule-Name ]
            *[ Charging-Rule-Base-Name ]
              [CC-Sub-Session-Id ]
              [ Bearer-Identifier ]
            *[ AVP ]
```

In the rules above, "CC-Sub-Session-Id" is the sub-session ID corresponding to the PCC rules.

A similar mechanism may be applied to the PDN information. For example, the APN-AMBR parameter may be:

```
APN-AMBR ::=    < AVP Header:xxxx >
                [ Max-Requested-Bandwidth-UL ]
                [ Max-Requested-Bandwidth-DL ]
                [CC-Sub-Session-Id ]
                *[ AVP ]
```

In the parameter above, "Max-Requested-Bandwidth-UL" and "Max-Requested-Bandwidth-DL" above indicate the shared maximum bandwidth information, and "CC-Sub-Session-Id" indicates the associated sub-session information.

Figure 9:
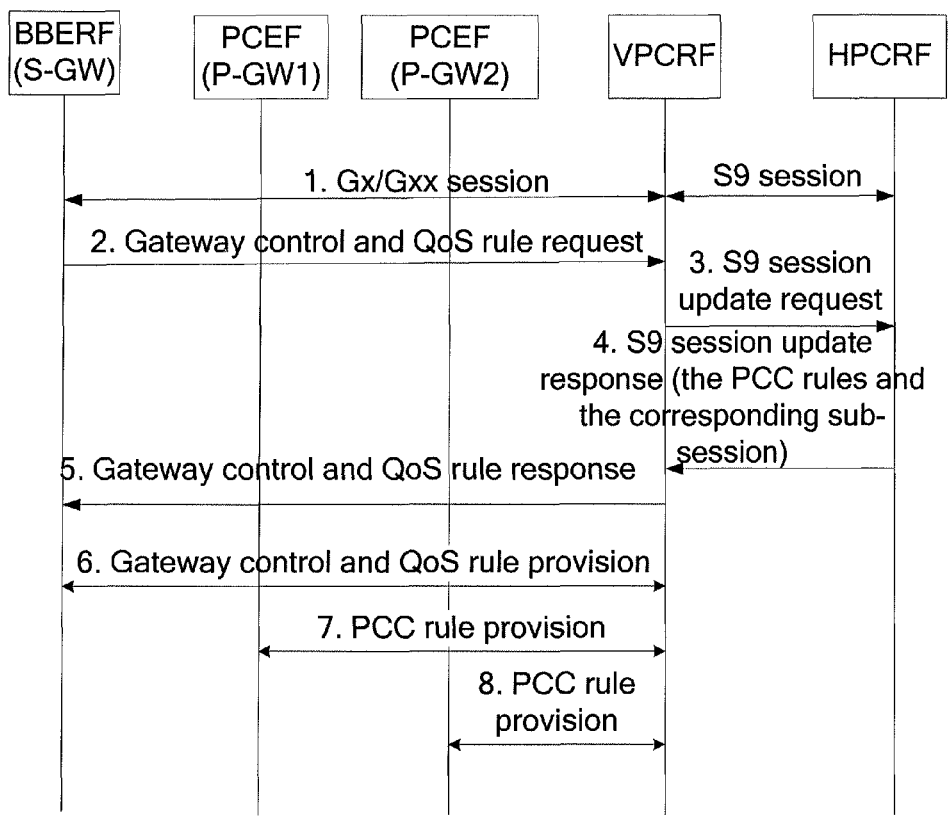
FIG. 9 is a flowchart of a sixth embodiment of the present disclosure.

FIG. 9 shows a roaming scenario of 3GPP access, where an S8 session is based on a PMIP protocol, a BBERF is located in an S-GW, a PCEF is located in the P-GW, and all P-GWs are located in the visited network. An S9 session is already created between the VPCRF and the HPCRF. The user has three IP-CAN sessions and three gateway control sessions, which correspond to three S9 sub-sessions S9_1, S9_2, and S9_3 respectively. Due to the change of the access technology, the HPCRF needs to modify the PCC rules corresponding to sub-sessions 1 and 2. Therefore, the S9 session update message carries the S9 session ID and the PCC rules of the corresponding sub-sessions 1 and 2. Meanwhile, the APN-AMBR parameter specific to the sub-session (namely, the corresponding IP-CAN session and/or gateway control session) is modified. The detailed steps are as follows:

1. The user has created three IP-CAN sessions and three gateway control sessions, which correspond to three S9 sub-sessions S9_1, S9_2, and S9_3 respectively.

2. Upon the change of the access technology, or as triggered by other conditions, the BBERF (S-GW) initiates gateway control session update. Due to existence of the three gateway control sessions, the BBERF (S-GW) may initiate update of the three gateway control sessions simultaneously, or initiate update of only one of the three gateway control sessions.

3. The VPCRF sends a request for updating the S9 session. The request carries a trigger event and an S9 session ID, but carries no S9 sub-session ID, indicating that the events are specific to all sub-sessions.

4. According to the trigger event, the HPCRF modifies the corresponding PCC rules. The HPCRF sends an S9 session update message as a response to the VPCRF. The PCC rules include PDN information. Specifically, the rules may be derived by extending Charging-Rule-Definition and may carry sub-session information; or may be derived by extending Charging-Rule-Install to indicate that all installed rules are specific to a sub-session.

Meanwhile, the HPCRF modifies the APN-AMBR parameter shared by all non-GBR bearers under each PDN. For that purpose, the CCA message may carry multiple APN-AMBR parameters:

```
<CC-Answer> ::=    < Diameter Header: 272, PXY >
                   < Session-Id > carries only the main session ID,
    indicating that the message is specific to the main session
                   { Auth-Application-Id }
                   { Origin-Host }
                   { Origin-Realm }
                  *[ APN-AMBR ]      * indicates multiple parameters
                   Other AVPs are omitted
```

Each APN-AMBR is defined as:

```
APN-AMBR ::=    < AVP Header:xxxx >
                [ Max-Requested-Bandwidth-UL ]
                [ Max-Requested-Bandwidth-DL ]
                [CC-Sub-Session-Id]
                *[ AVP ]
```

"CC-Sub-Session-Id" above indicates the associated sub-session information. In this way, one message may carry multiple APN-AMBR parameters, and each parameter is associated with a sub-session (such as sub-session 1 or 2).

5. The VPCRF sends a gateway control session response (CCA) to the BBERF (S-GW). If the rules returned by the HPCRF include the corresponding sub-session information, the rules are sent through the corresponding message to the BBERF directly.

6. If the BBERF requests to update only one gateway control session, but the rules returned by the HPCRF include the rules specific to other sub-sessions, the VPCRF initiates the rule update process in other gateway control sessions actively (through an RAR message).

7. Because the modified APN-AMBR parameters returned by the HPCRF include the parameters specific to sub-session 1, the modified APN-AMBR parameters still need to be sent to the corresponding PCEF1.

8. Because the modified APN-AMBR parameters returned by the HPCRF include the parameters specific to sub-session 2, the modified APN-AMBR parameters still need to be sent to the corresponding PCEF2.

In the embodiments above, an S9 session message carries PDN information, and therefore, in a multi-PDN scenario, the S9 session can distinguish and handle creation, modification and deletion of the IP-CAN session and the gateway control session, and the V-PCRF can understand the information delivered by the H-PCRF, and send the information to the correct PCEF or BBERF for enforcement; moreover, the V-PCRF can report the PDN connection release information to the H-PCRF, and the H-PCRF releases the corresponding PDN connection, thus avoiding ineffective occupation of resources and ensuring correct policies.

After reading the foregoing embodiments, those skilled in the art are clearly aware that the embodiments of the present disclosure may be implemented through hardware, or, preferably, through software in addition to a necessary universal hardware platform in most circumstances. Therefore, the contributions made by the present disclosure to the prior art may be partially or completely embodied as a software product. The software product may be stored in a storage medium such as a Read Only Memory/Random Access Memory (ROM/RAM), a magnetic disk, or a Compact Disk-Read Only Memory (CD-ROM), and incorporates several instructions for instructing a computer device (for example, a personal computer, a server, or a network device) to execute the method specified in each embodiment of the present disclosure or a part of an embodiment.

It is apparent to persons skilled in the art that various modifications and variations can be made to the present disclosure without departing from the scope of the disclosure. The disclosure shall cover the modifications and variations provided that they fall within the scope of protection defined by the appended claims or their equivalents.

What is claimed is:

1. A method for implementing Policy and Charging Control (PCC) in a multi-Packet Data Network (PDN) scenario, comprising:

receiving, by a Visited Policy Control and Charging Rules Function (VPCRF), PCC rules sent by a Home Policy Control and Charging Rules Function (HPCRF), and S9 sub-session information that is associated with the PCC rules and sent by the HPCRF; and sending, by the VPCRF, the PCC rules according to the S9 sub-session information;

wherein an S9 sub-session identified by the S9 sub-session information is in a mapping relationship with an Internet Protocol Connectivity Access Network (IP-CAN), session and a gateway control session, and wherein the S9 sub-session is a session between the VPCRF and the HPCRF;

wherein the step of sending, by the VPCRF, the PCC rules according to the associated S9 sub-session information comprises:

sending, by the VPCRF, the PCC rules through a corresponding IP-CAN session and a gateway control session according to the mapping relationship between the S9 sub-session identified by the S9 sub-session information and the IP-CAN session and the gateway control session;

wherein the step of sending the PCC rules comprises:

sending the PCC rules to a PDN gateway, through the IP-CAN session; and obtaining Quality of Service, QoS, rules from the PCC rules, and sending the QoS rules to a Serving Gateway, S-GW, through the gateway control session.

2. A system for implementing Policy and Charging Control (PCC) in a multi-Packet Data Network (PDN) scenario, comprising a computer device with at least one processor implementing functions:

a Home Policy Control and Charging Rules Function (HPCRF) that sends the PCC rules and S9 sub-session information associated with the PCC rules to a Visit Policy Control and Charging Rules Function (VPCRF); and the VPCRF that receives the PCC rules and S9 sub-session information associated with the PCC rules from the HPCRF, and sends the PCC rules according to the S9 sub-session information;

wherein an S9 sub-session identified by the S9 sub-session information is in a mapping relationship with an Internet Protocol Connectivity Access Network (IP-CAN), session and a gateway control session, and wherein the S9 sub-session is a session between the VPCRF and the HPCRF;

wherein the VPCRF further sends the PCC rules through a corresponding IP-CAN session and a gateway control session according to the mapping relationship between the S9 sub-session identified by the S9 sub-session information and the IP-CAN session and the gateway control session;

wherein the VPCRF further sends the PCC rules to a PDN gateway through the IP-CAN session; and obtains Quality of Service, QoS, rules from the PCC rules, and sends the QoS rules to a Serving Gateway, S-GW, through the gateway control session.

* * * * *